(12) United States Patent
DesJardin (10) Patent No.: US 8,356,830 B2
(45) Date of Patent: Jan. 22, 2013

(54) ADJUSTABLE PLATFORM ASSEMBLY FOR A TRAILER

(76) Inventor: Joseph N. DesJardin, Harrison Township, MI (US)

(*) Notice: Subject to any disclaimer, the term of this patent is extended or adjusted under 35 U.S.C. 154(b) by 5 days.

(21) Appl. No.: 12/878,094

(22) Filed: Sep. 9, 2010

(65) Prior Publication Data

US 2012/0061948 A1  Mar. 15, 2012

(51) Int. Cl.
*B60P 3/10* (2006.01)
(52) U.S. Cl. .................... 280/414.1; 280/163
(58) Field of Classification Search ............. 280/414.1, 280/163, 166, 164.1, 763.1, 766.1, 656; 248/689, 248/352
See application file for complete search history.

(56) References Cited

U.S. PATENT DOCUMENTS

| 2,486,783 | A | * | 11/1949 | Hartman et al. | ............... | 182/120 |
| 4,056,270 | A | | 11/1977 | Greenfield | | |
| 4,943,076 | A | | 7/1990 | Tripke | | |
| 5,799,962 | A | | 9/1998 | Barnhart | | |
| 6,966,406 | B2 | * | 11/2005 | Nash, Jr. | ............... | 182/122 |
| 6,986,523 | B1 | * | 1/2006 | Bickford | ............... | 280/414.1 |
| 7,390,003 | B1 | | 6/2008 | Sylvia | | |
| 2009/0014978 | A1 | | 1/2009 | Shumway | | |

* cited by examiner

*Primary Examiner* — J. Allen Shriver, II
*Assistant Examiner* — James Triggs
(74) *Attorney, Agent, or Firm* — Harness, Dickey & Pierce, P.L.C.

(57) ABSTRACT

A platform assembly for a trailer includes a first bracket and a platform. The first bracket is configured to be fixed to the trailer. The platform is coupled to the first bracket and rotatable about a lateral axis of the trailer when the first bracket is fixed to the trailer.

20 Claims, 7 Drawing Sheets

ADJUSTABLE PLATFORM ASSEMBLY FOR A TRAILER

FIELD

The present disclosure relates to platform assemblies, and more specifically, to adjustable platform assemblies for trailers such as a boat trailer.

BACKGROUND

This section provides background information related to the present disclosure which is not necessarily prior art.

When launching or loading a boat, a boat operator must often access a winch located near a tongue of a boat trailer while the boat trailer is partially submerged in water. In addition to being submerged in water, the boat trailer is often on an incline that slopes downward into the water. Thus, the boat operator must access the winch located near the tongue of the trailer by either maneuvering over a vehicle towing the boat trailer or maneuvering over the boat. Maneuvering over a vehicle or maneuvering over a boat while a boat trailer is submerged in water and at an angel presents a risk of injury to the boat operator.

Steps or platforms have been developed that attach to either a trailer or a vehicle to provide access to various points of the trailer. However, these steps or platforms have limited to no adjustability once fixed to a trailer or a vehicle. In addition, those steps or platforms that are adjustable can be difficult to adjust. Moreover, the location, surface area, and adjustability of these steps or platforms are insufficient to manipulate the trailer to complete common tasks such as turning a winch while launching or loading a boat.

SUMMARY

This section provides a general summary of the disclosure, and is not a comprehensive disclosure of its full scope or all of its features.

A platform assembly for a trailer includes a first bracket and a platform. The first bracket is configured to be fixed to the trailer. The platform is coupled to the first bracket and rotatable about a lateral axis of the trailer when the first bracket is fixed to the trailer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A platform assembly according to the principles of the present disclosure can be quickly and easily adjusted in various ways to access and manipulate various items on a trailer and to store the platform assembly. The platform assembly includes a platform that can be stored above a trailer and within the width of the trailer. The platform can be translated laterally outward to either side of the trailer. In one example, this ability to translate may enable an operator to step from a dock onto the platform and to access a winch on the trailer adjacent to the platform. The platform may be rotated relative to a vertical axis of the trailer to provide access to various points of the trailer and to allow an operator to step onto the platform from various entry locations. The platform may be rotated relative to a lateral axis of the trailer to level the platform while the trailer is on an incline.

Referring to FIGS. 1 through 6, a platform assembly 10 includes a first bracket 12, a second bracket 14, a third bracket 16, and a platform 18. The first bracket 12 includes a first plate 20 and a second plate 22 that can be positioned on opposite sides of a trailer frame. The first plate 20 includes a top or first end 24, a bottom or second end 26, a trailer-engaging or first surface 28, and a second surface 30 opposite the first surface 28.

The first plate 20 also includes holes 32, a hole 34, and holes 36 extending through the first and second surfaces 28, 30. The holes 32 are configured to receive fasteners such as bolts or screws, the hole 34 is configured to receive a shaft, and the holes 36 are configured to receive a pin.

The second plate 22 includes a top or first end 38, a bottom or second end 40, and a first surface 42 opposite a trailer-engaging or second surface 44. The corners of the first ends 24, 38 of the first and second plates 20, 22 may be rounded as shown to provide clearance for a platform positioned above the first and second plates 20, 22. The second plate 22 also includes holes 46, a hole 48, and holes 50 extending through the first and second surfaces 42, 44. The holes 46 are configured to receive fasteners such as bolts or screws, the hole 48 is configured to receive a shaft, and the holes 50 are configured to receive a pin.

When the first and second plates 20, 22 are positioned on opposite sides of a trailer frame, spacers 52 may be positioned between the first and second plates 20, 22 and above and below the trailer frame. Each of the spacers 52 includes a bore 53 extending through the length of each of the spacers 52. The spacers 52 may be positioned so that the bores 53 align with the holes 46 in the second plate 22 and the holes 32 in the first plate 20.

When the spacers 52 positioned as described above, fasteners (not shown) may be inserted through the holes 46 in the second plate 22, through the bores 53 in the spacers 52, and through the holes 32 in the first plate 20. When inserted, the fasteners may be tightened to clamp the trailer frame between the first and second plates 20, 22 and thereby fix the first bracket 12 to the trailer frame. As the fasteners are tightened, the spacers 52 may distribute clamping loads to the first and second plates 20, 22 and thereby reduce mechanical stress within the first and second plates 20, 22. The spacers 52 may also engage the top surface and/or the bottom surface of the trailer frame to vertically position the first bracket 12 relative to the trailer frame.

The second bracket 14 includes a first plate 54, a second plate 56, a third plate 58, a fourth plate 60, and a fifth plate 62. The first and second plates 54, 56 may be a single plate that is bent to form an L-shaped bracket. The third and fourth plates 58, 60 may be welded to the sides of the first and second plates 54, 56. The fifth plate 62 may be welded to interior surfaces of the first, third, and fourth plates 54, 58, 60 near a vertical mid-point of the first, third, and fourth plates 54, 58, 60.

The first plate 54 includes a hole 64 and holes 66 extending through the first plate 54 for receiving a shaft and a pin, respectively. The third plate 58 may include tapered edges 68 to provide ground clearance. The second plate 56 includes a hole 70 and holes 72 extending through the second plate 56 for receiving a shaft and a pin, respectively. The holes 72 are radially positioned about the hole 70. The fifth plate 62 includes a hole 74 for receiving a shaft.

When the first bracket 12 is fixed to a trailer frame, the second bracket 14 can be positioned against the first bracket 12 so that the hole 64 in the second bracket 14 is aligned with the holes 48 and 34 in the first bracket 12. The second bracket 14 can also be positioned so that one of the holes 66 in the second bracket 14 is aligned with one of the holes 50 in the second plate 22 of the second bracket 14 and with one of the holes 36 in the first plate 20 of the second bracket 14. The second bracket 14 may include tabs 75 positioned around a perimeter of the hole 64 in the second bracket 14 and configured to extend into the holes 34, 48 of the first bracket 12 to facilitate this alignment.

When the second bracket 14 is positioned as described above, a shaft 76 can be inserted through the first and second brackets 12, 14 to couple the first and second brackets 12, 14 while allowing the second bracket 14 to rotate about the shaft 76. The shaft 76 can be inserted through the hole 64 in the second bracket 14, through the hole 48 in the second plate 22 of the first bracket 12, and through the hole 34 in the first plate 20 of the first bracket 12. The shaft 76 may extend along a lateral axis of a trailer. The shaft 76 includes a bore 78 extending through the length of the shaft 76 and holes 80 extending perpendicular to the bore 78.

Figures 6, 7, 8:
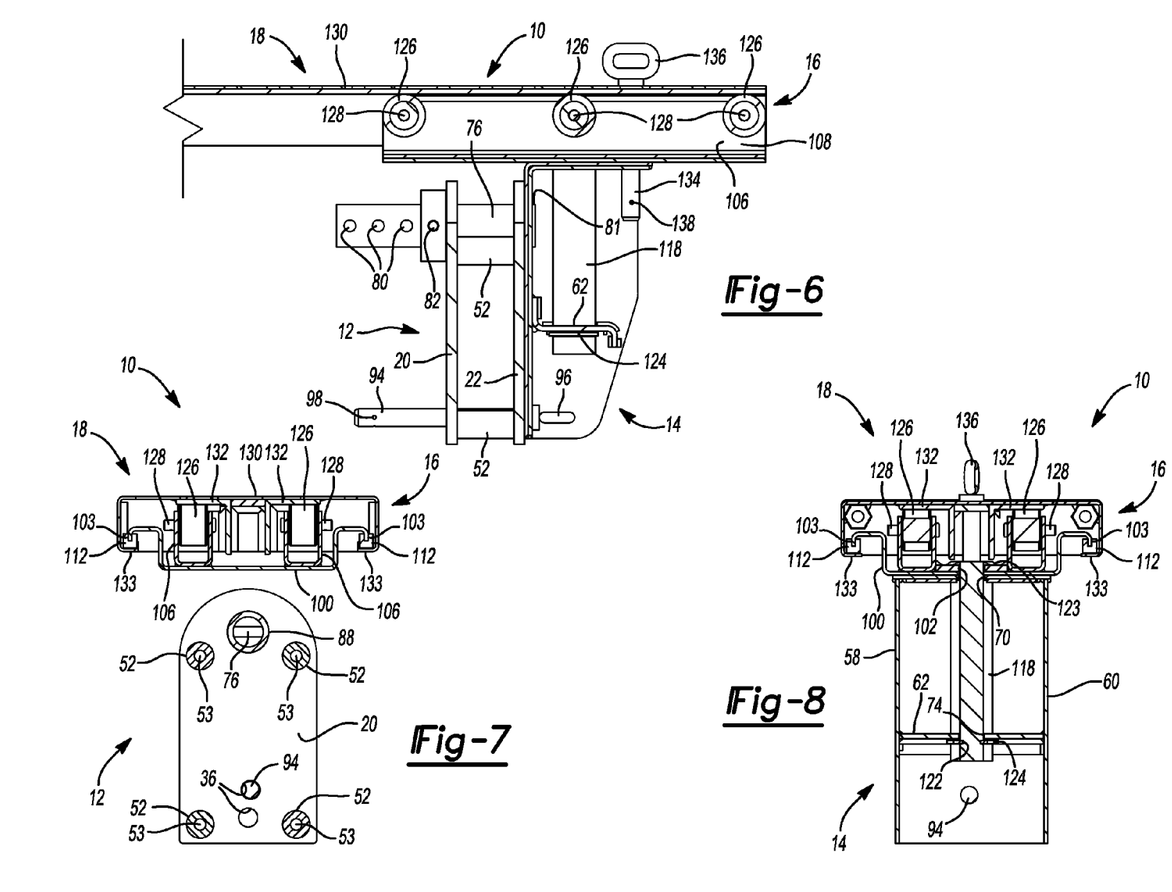
FIG. 6 is a sectional view of the platform assembly of FIG. 1 taken along the line 6-6 shown in FIG. 1.
FIG. 7 is a sectional view of the platform assembly of FIG. 1 taken along the line 7-7 shown in FIG. 3.
FIG. 8 is a sectional view of the platform assembly of FIG. 1 taken along the line 8-8 shown in FIG. 3.

As best shown in FIG. 6, the shaft 76 may also include a shoulder 81 at one end of the shaft 76. The shoulder 81 engages the first plate 54 of the second bracket 14 to prevent the shaft 76 from sliding completely through the second bracket 14. A shaft collar 82 may be slid over the shaft 76 at the end opposite the shoulder 81 to prevent the shaft 76 from sliding completely through the holes 34, 48 in the first bracket 12 toward the second bracket 14. The shaft collar 82 includes a bore 84 extending through the shaft collar 82 for receiving the shaft 76 and a hole 86 extending at least partially through the shaft collar 82 perpendicular to the bore 84.

When the shaft 76 is inserted as described above, the shaft collar 82 can be slid over the shaft 76 and positioned so that the hole 86 in the shaft collar 82 aligns with one of the holes 80 in the shaft 76. With the shaft collar 82 in this position, a fastener 88 can be inserted into the hole 86 in the shaft collar 82 and in the one of the holes 80 in the shaft 76 aligned with the hole 86. The fastener 88 may include a head 90 and a hole 92. The head 90 can be used to position the fastener 88 within the hole 86 and the one of the holes 80 aligned with the hole 86. The hole 92 can be configured to receive a securing mechanism, such as a hitch pin, that prevents the fastener 88 from backing out.

The one of the holes 80 in the shaft 76 with which the hole 86 in the shaft collar 82 is aligned may depend on the width of the frame about which the first bracket 12 is clamped. For example, the hole 86 in the shaft collar 82 may be aligned with one of the holes 80 in the shaft 76 closer to the end of the shaft 76 for a wider frame. Conversely, the hole 86 in the shaft collar 82 may be aligned with one of the holes 80 in the shaft 76 closer to the middle of the shaft 76 for a narrower frame. In this manner, the holes 80 in the shaft 76 enable the platform assembly 10 to be used with trailer frames of various widths.

When the shaft 76 is secured as described above, a pin 94 can be inserted through the first and second brackets 12, 14 to prevent the second bracket 14 from rotating about the shaft 76. The pin 94 can be inserted into one of the holes 66 in the second bracket 14, into one of the holes 50 in the second plate 22 of the first bracket 12, and into one of the holes 36 in the first plate 20 of the first bracket 12. The pin 94 includes a handle 96 and a hole 98. The pin 94 may be held by the handle 96 when inserting the pin 94 into the first and second brackets 12, 14. When the pin 94 is inserted into the first and second brackets 12, 14, a securing mechanism such as a hitch pin may be inserted into the hole 98 in the pin 94 to prevent the pin 94 from backing out.

The pin 94 may be tethered to the second bracket 14 to prevent the pin 94 from being lost when rotating the second bracket 14 about the shaft 76. Alternatively, the platform assembly 10 may include a biasing mechanism (not shown)

that secures the pin 94 and biases the pin 94 into the holes 36, 50, and 66 in the first plate 20 of the first bracket 12, in the second plate 22 of the first bracket 12, and in the second bracket 14. When repositioning the pin 94, the pin 94 may be moved against the biasing force of the biasing mechanism until the pin 94 no longer extends through the holes 36, 50, and 66 in the first plate 20 of the first bracket 12, in the second plate 22 of the first bracket 12, and in the second bracket 14.

The biasing mechanism secures the pin 94 while allowing the pin 94 to be repositioned from one of the holes 66 in the second bracket 14 to another one of the holes 66 in the second bracket 14. When the pin 94 is aligned with a desired one of the holes 66 in the second bracket 14, the pin 94 may be released. This allows the biasing mechanism to bias the pin 94 into the desired one of the holes 66 in the second bracket 14, into one of the holes 50 in the second plate 22 of the first bracket 12, and into one of the holes 36 in the first plate 20 of the first bracket 12.

Figure 1:
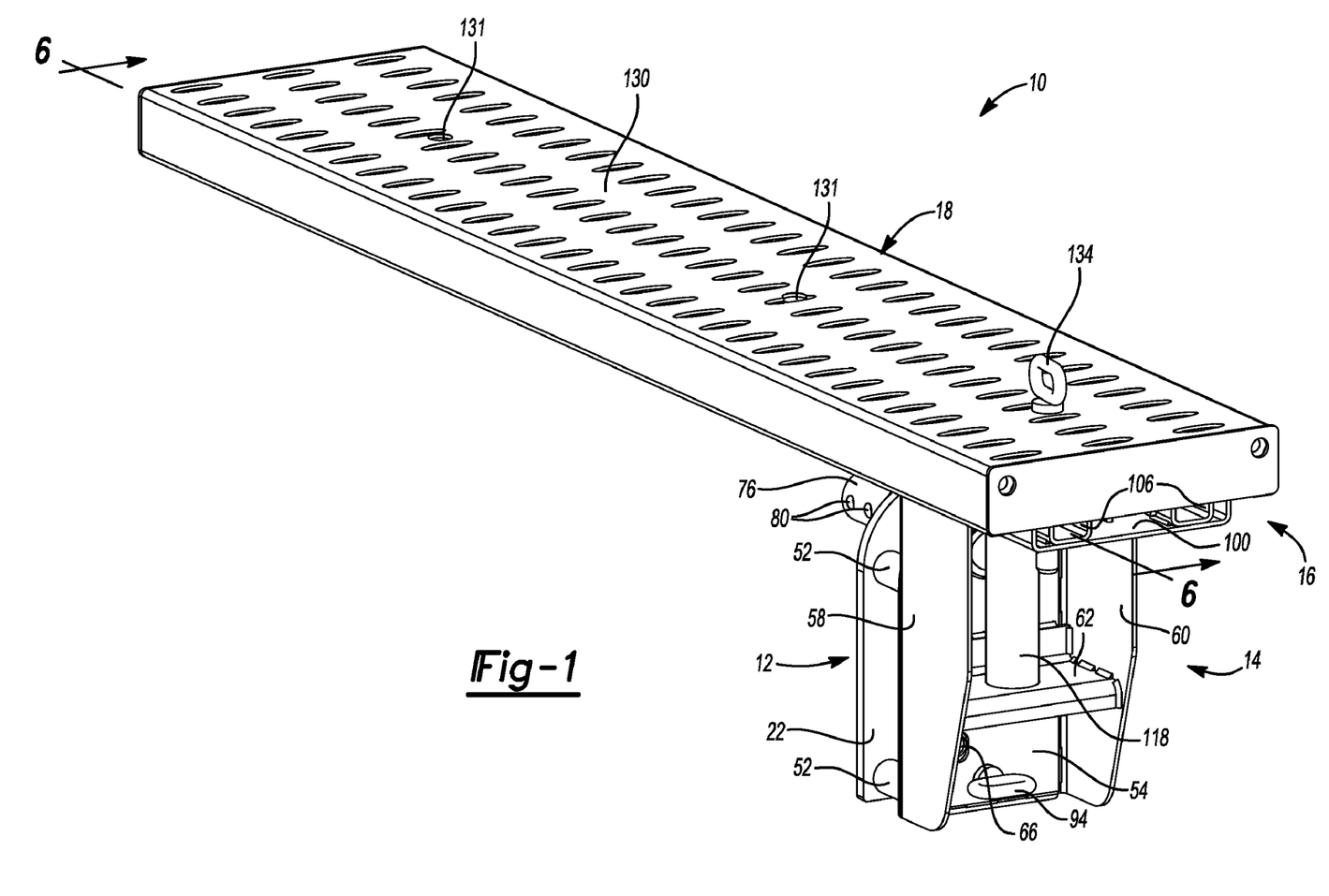
FIG. 1 is an isometric view of a platform assembly according to the principles of the present disclosure.
Figure 2:
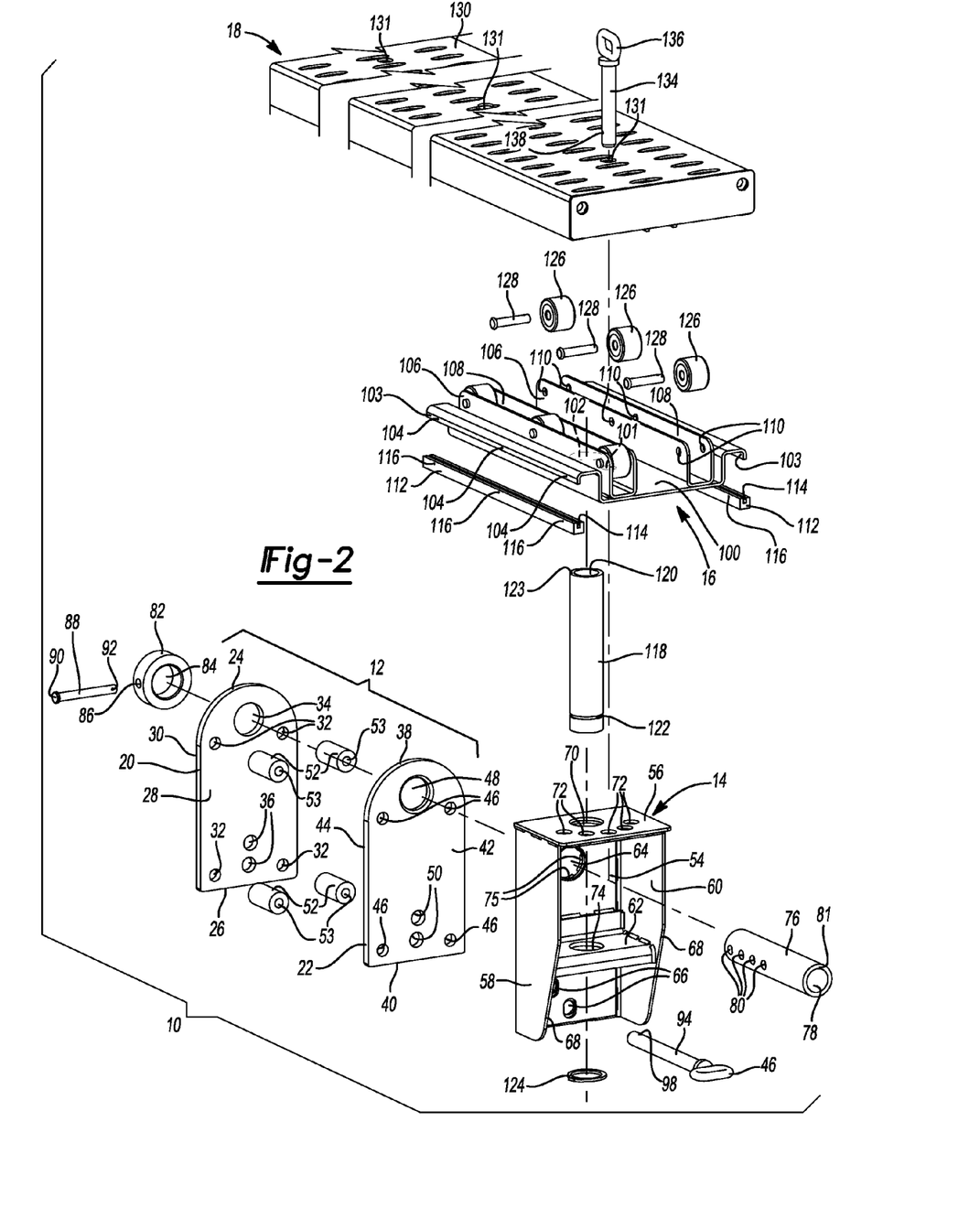
FIG. 2 is an exploded isometric view of the platform assembly of FIG. 1.
Figure 3:
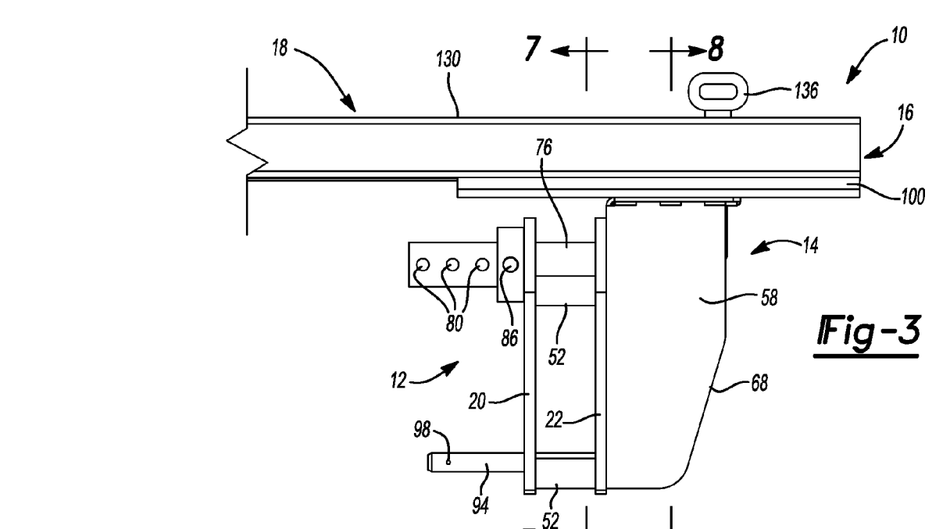
FIG. 3 is a front view of the platform assembly of FIG. 1.
Figure 4:
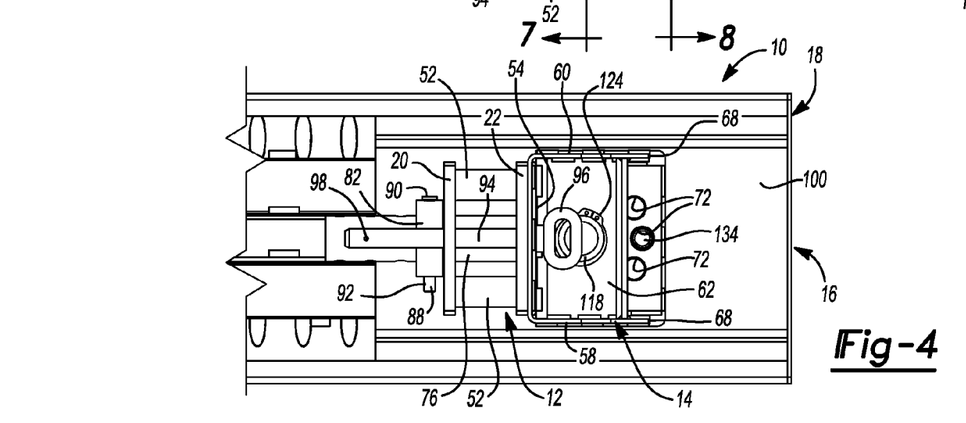
FIG. 4 is a bottom view of the platform assembly of FIG. 1.
Figure 5:
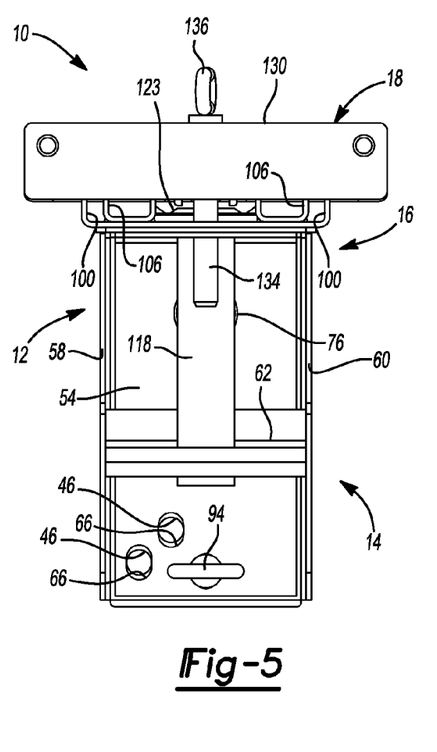
FIG. 5 is a side view of the platform assembly of FIG. 1.

The third bracket 16 includes a base plate 100 having several bends across the width of the base plate 100 that extend along the length of the base plate 100. The base plate 100 includes a hole 101 for receiving a pin, a hole 102 for receiving a shaft, and tabs 103 at the edges of the base plate 100. The tabs 103 may extend downward toward the bottom plane of the base plate 100 and may include holes 104 extending through the tabs 103.

The third bracket 16 may also include roller brackets 106 defining channels 108 configured to receive rollers. The channels 108 extend along the length of the roller brackets 106. The roller brackets 106 may have a generally U-shaped cross-section. The roller brackets 106 include holes 110 extending through the roller brackets 106 perpendicular to the channels 108. The roller brackets 106 may be welded or fastened to the base plate 100.

The third bracket 16 may also include extensions 112. The extensions 112 may have a generally U-shaped cross-section defining slots 114 that extend along the length of the extensions 112. The extensions 112 may include holes 116 that extend through the extensions 112 perpendicular to the slots 114.

As described in more detail below, the extensions 112 can be attached to the edges of the base plate 100 to couple the platform 18 to the third bracket 16. Before attaching the extensions 112 to the edges of the base plate 100, the slots 114 in the extensions 112 receive the tabs 103 on the base plate 100. When the tabs 103 of the base plate 100 are engaging the slots 114 in the extensions 112, fasteners may be inserted into the holes 116 in the extensions 112 and into the holes 104 in the tabs 103 to secure the extensions 112 to the base plate 100.

The third bracket 16 can be positioned on the second bracket 14 so that the holes 102, 101 in the third bracket 16 are aligned with the hole 70 in the second bracket 14 and one of the holes 72 in the second bracket 14, respectively. When the third bracket 16 positioned as such, a shaft 118 can be inserted through the hole 102 in the third bracket 16 and through the holes 70, 74 in the second bracket 14. The shaft 118 may extend along a vertical axis of a trailer. The shaft 118 includes a bore 120 extending through the length of the shaft 118 and a groove 122 extending around a perimeter of the shaft 118.

As best shown in FIG. 8, the shaft 118 may also include a shoulder 123. The shoulder 123 engages the top surface of the third bracket 16 to prevent the shaft 118 from sliding downward completely through the third bracket 16. A snap ring 124 may be received in the groove 122 and used to prevent the shaft 118 from sliding upward through the third bracket 16.

Rollers 126 may be positioned in the channels 108 of the roller brackets 106. Bores extending through the rollers 126 may be aligned with the holes 110 and the roller brackets 106, and pins or axles 128 may be inserted through the holes 110 in the roller brackets 106 and through the bores in the rollers 126. In this regard, the axles 128 may couple the rollers 126 to the roller brackets 106 and the rollers 126 may rotate about the axles 128.

The platform 18 includes a walking surface 130 on which an operator may walk to access and manipulate various items on a trailer. The platform 18 may be generally rectangular as shown. The platform 18 includes a walking surface 130 and holes 131 extending through the walking surface 130. The walking surface 130 may be perforated to provide traction to a walking operator and to facilitate drainage. The holes 131 may be positioned at or near a center line of the platform 18 at various points along the length of the platform 18.

As best shown in FIGS. 7 and 8, the platform 18 also includes rails 132 and tabs 133. The rails 132 extend along the length of the platform 18. The rails 132 may have an L-shaped cross-section with one leg of the L-shaped cross-section against the underside of the platform 18 and the other leg of the L-shaped cross-section extending downward from the underside of the platform 18. The rollers 126 engage the rails 132 when the platform 18 is translated relative to the third bracket 16. The rails 132 may be fastened or welded to the underside of the platform and may be linked together.

The length of the tabs 133 extend along the length of the platform 18. The cross-sections of the tabs extend from the forward and rearward sides of the platform 18 toward the centerline of the platform 18. The tabs 133 of the platform 18 may engage the extensions 112 of the third bracket 16 to couple the platform 18 to the third bracket 16 while allowing the platform 18 to translate on the rollers 126. In addition, the extensions 112 may be detached from the tabs 103 of the third bracket 16 to enable disassembly of the platform 18 from the third bracket 16.

The platform 18 can be placed over the third bracket 16 so that the length of the platform 18 is parallel to the length of the third bracket 16. The platform 18 can then be lowered onto the third bracket 16 until the platform 18 is supported by the rollers 126. At this point, the extensions 112 may be inserted between the tabs 103 on the third bracket 16 and the tabs 133 on the platform 18 to couple the platform 18 to the third bracket 16 while allowing the platform 18 to translate on the rollers 126.

A pin 134 may be inserted into the desired one of the holes 131 in the platform 18, into the hole 101 in the third bracket 16, and into a desired one of the holes 72 in the second bracket 14. The pin 134 includes a handle 136 and a hole 138 extending through the pin 134 perpendicular to the length of the pin 134. The pin 134 may be held by the handle 136 when inserting the pin 134 into the platform 18, into the third bracket 16, and into the second bracket 14. Once the pin 134 is inserted, a securing mechanism such as a hitch pin may be inserted into the hole 138 in the pin 134 to prevent the pin 134 from backing out.

The pin 134 may be tethered to the platform 18 to prevent the pin 134 from being lost when translating the platform 18 on the rollers 126 or rotating the platform 18 about the shaft 118. Alternatively, the platform assembly 10 may include a biasing mechanism (not shown) that secures the pin 134 and biases the pin 134 into the holes 72, 101, 131 in the second bracket 14, in the third bracket 16, and in the platform 18. The pin 134 may be moved against the biasing force of the biasing mechanism until the pin 134 no longer extends through the holes 72, 101, 131 in the second bracket 14, in the third bracket 16, and in the platform 18.

The platform 18 may then be translated on the rollers 126 and rotated about the shaft 118 until the platform 18 is in a desired position. When the platform 18 is in the desired position, the pin 134 may be released, allowing the biasing mechanism to bias the pin 134 into the holes 72, 101, 131 in the second bracket 14, in the third bracket 16, and in the platform 18.

Referring to FIGS. 9 through 12, operation of the platform assembly 10 will now be described. With specific reference to FIG. 9, the platform assembly 10 is shown attached to a trailer 140 that includes a left frame section 142, a center frame section 144, a right frame section 146, and a tongue 148. The platform assembly 10 is shown in a storage or retracted position in which the platform assembly 10 extends perpendicular to and across the frame sections 142, 144, 146. In this storage position, the platform assembly 10 may be positioned between the trailer 140 and a boat (not shown) and within the width of the trailer 140. This prevents damage to the platform assembly 10 or to the trailer 140 that may be caused transporting the trailer 140 with the platform assembly 10 extending beyond the width of the trailer 140.

Figure 9:
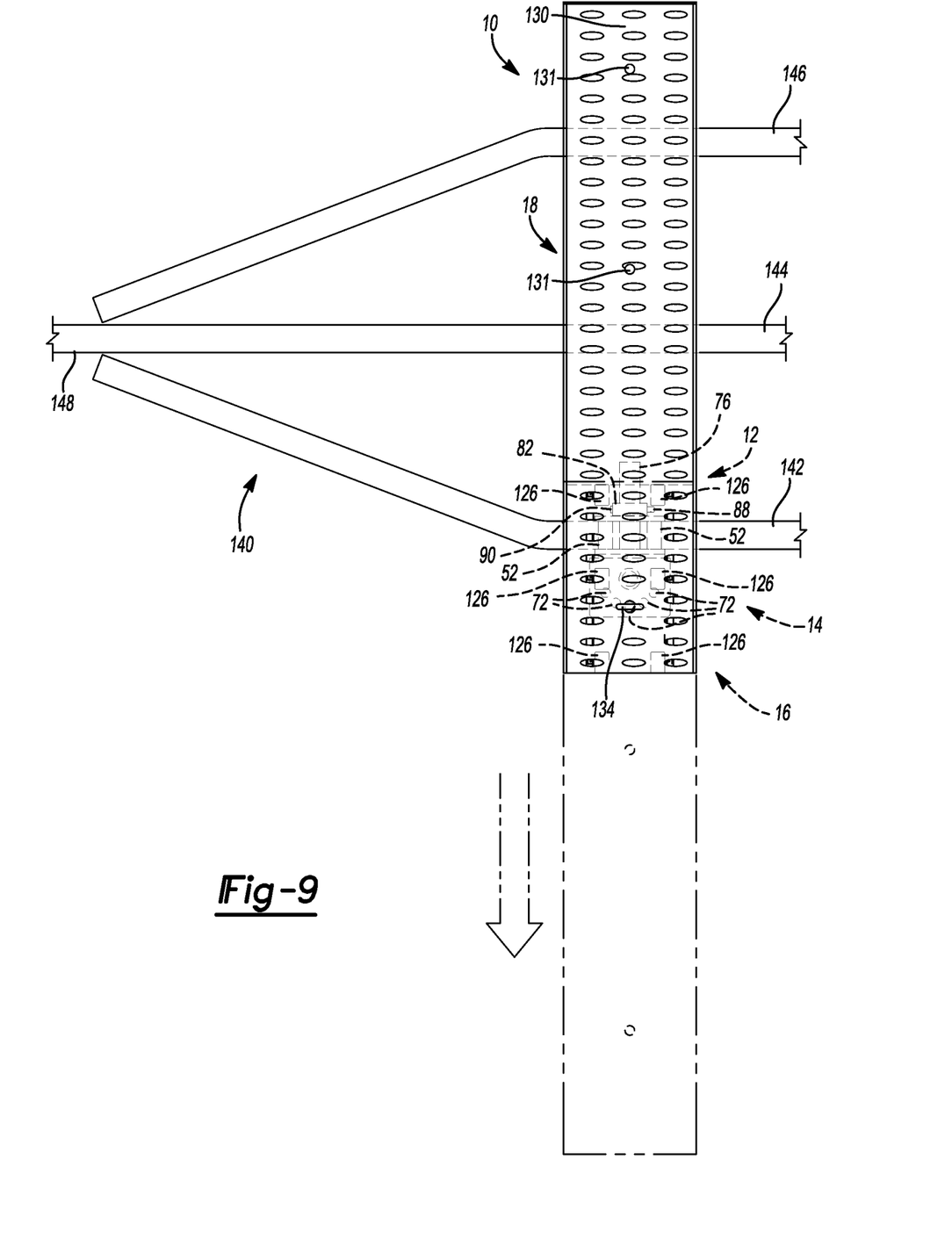
FIG. 9 is a top view of the platform assembly of FIG. 1 attached to a trailer in a storage or retracted position, with phantom lines showing the platform assembly in an extended position.

The platform 18 can be translated from the storage position to an extended position represented by phantom lines in FIG. 9. Before translating the platform 18, the pin 134 is removed from the holes 72 in the second bracket 14, the hole 101 in the third bracket 16, and the holes 131 in the platform 18. With the pin 134 removed, the platform 18 is translated relative to the remainder of the platform assembly 10 on the rollers 126 captured in the third bracket 16. In the extended position, the rightmost one of the holes 131 in the platform 18 is aligned with the hole 101 in the third bracket 16 and the center one of the holes 72 in the second bracket 14. When the platform 18 is translated to the extended position, the pin 134 may be inserted into the rightmost one of the holes 131, into the hole 101 in the third bracket 16, and into the center one of the holes 72 in the second bracket 14. Insertion of the pin 134 prevents the platform 18 from translating relative to the remainder of the platform assembly 10 or rotating about a vertical axis of the trailer 140. The number and positioning of the holes 131 in the platform can be adjusted to refine the translatability of the platform 18.

Figure 10:
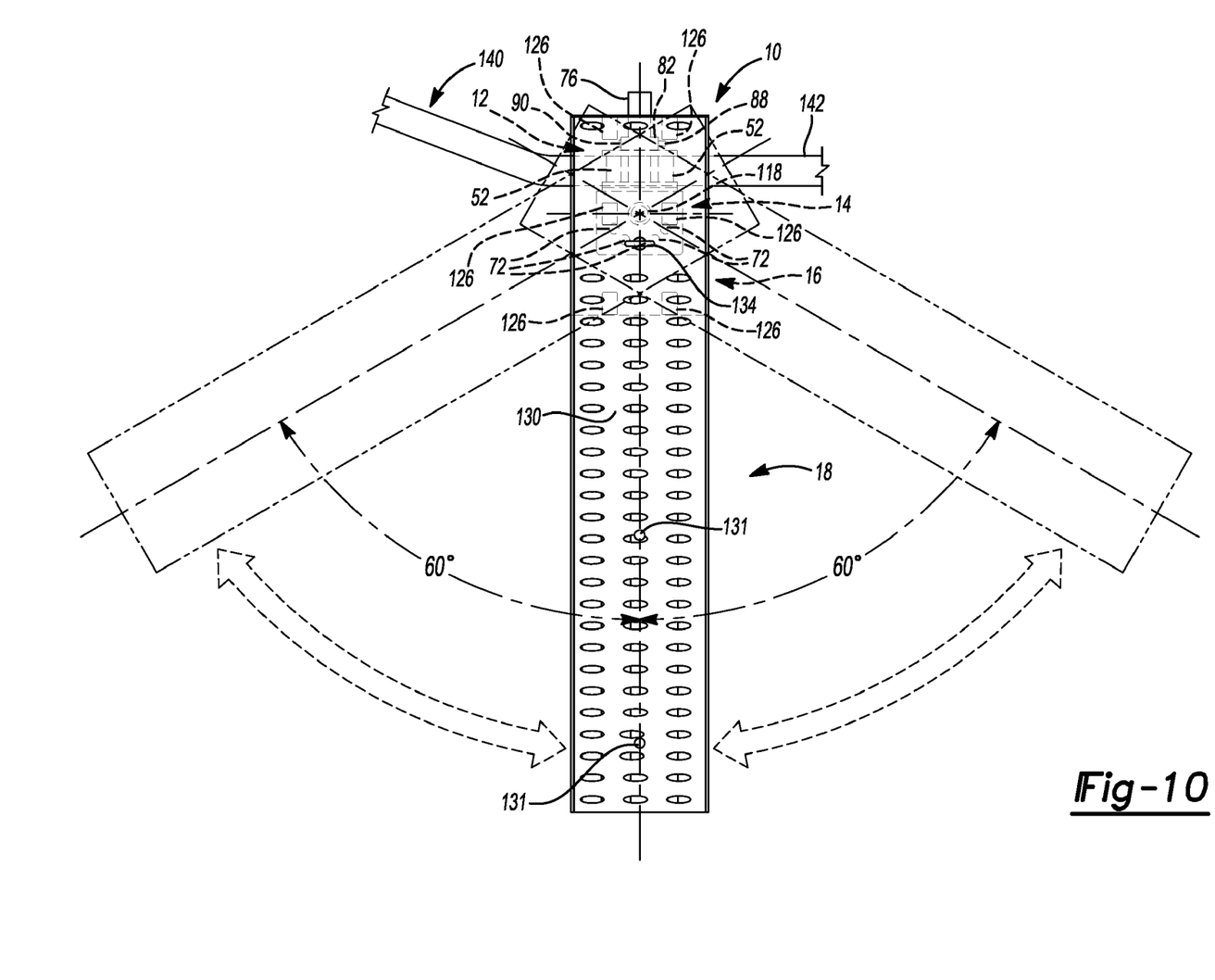
FIG. 10 is a top view of the platform assembly of FIG. 1 attached to a trailer in an extended position, with phantom lines showing the platform assembly rotated relative to a vertical axis of the trailer.

With specific reference to FIG. 10, the platform 18 can be rotated 60 degrees clockwise and counterclockwise about the shaft 118 from the extended position represented by phantom lines in FIG. 10. The pin 134 can be removed to rotate the platform 18 about the shaft 118. The pin 134 is removed from the holes 72 in the second bracket 14 and the hole 101 in the third bracket 16. The pin 134 may be removed from the holes 131 in the platform 18. When the pin 134 is removed, the platform 18 is rotated about the shaft 118 until the platform 18 is in a desired position and one of the holes 131 in the platform 18 aligns with the hole 101 in the third bracket 16 and one of the holes 72 in the second bracket 14. The number and positioning of the holes 72 in the second bracket 14 can be adjusted to refine the adjustability of the platform 18 about a vertical axis of the trailer 140.

Figures 11, 12:
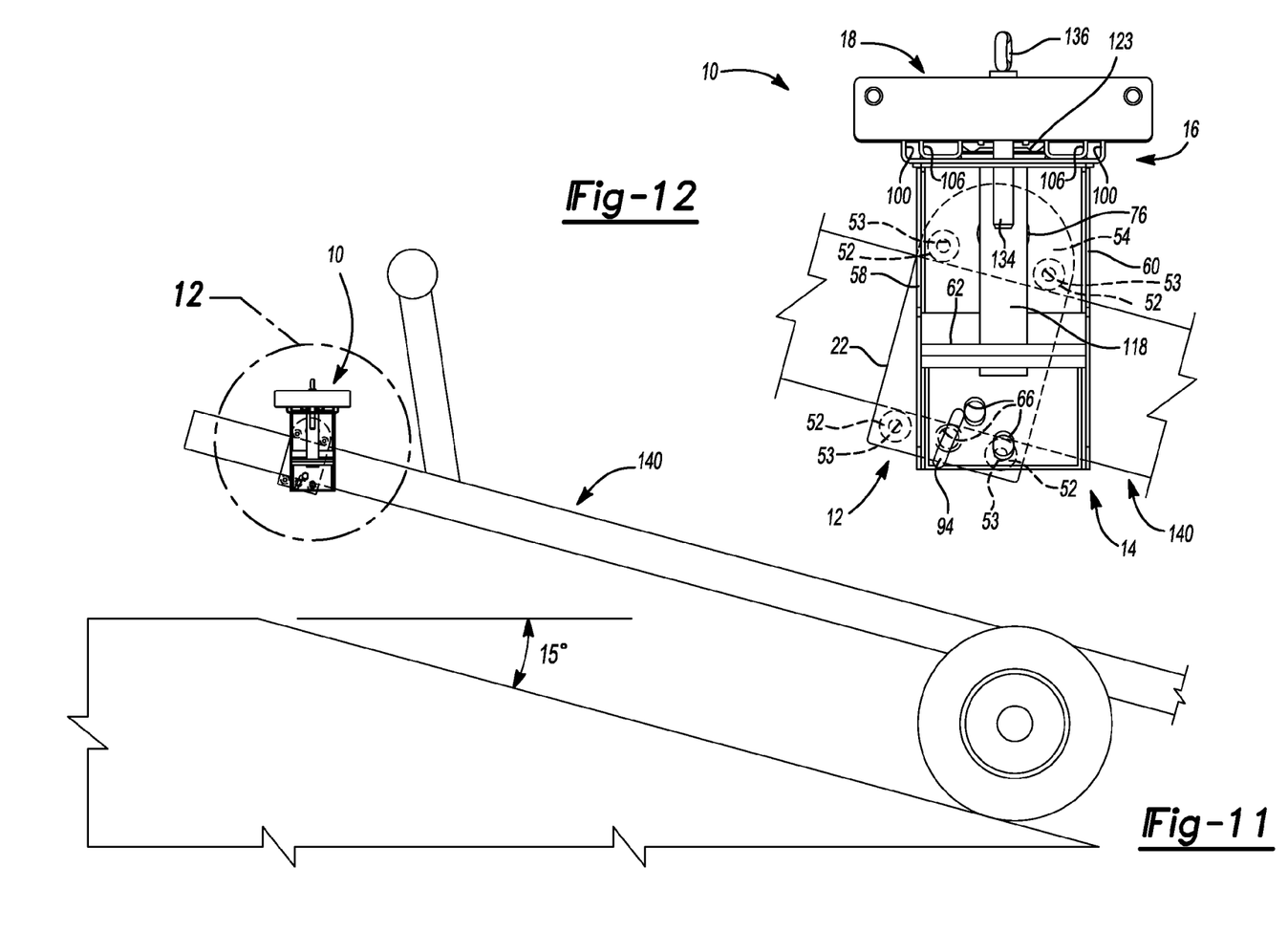
FIG. 11 is a side view of the platform assembly of FIG. 1 attached to a trailer and rotated relative to a lateral axis of the trailer to level the platform assembly while the trailer is on an incline.
FIG. 12 is an enlarged view of the platform assembly of FIG. 1 attached to a trailer and in the position shown in FIG. 11.

With specific reference to FIGS. 11 and 12, the platform 18 can be rotated about the shaft 76 to level the platform 18 when the trailer 140 is on an incline or a decline. Before rotating the platform 18 about the shaft 76, the pin 94 is removed from the holes 36 in the first plate 20 of the first bracket 12, the holes 50 in the second plate 22 of the first bracket 12, and the holes 66 in the second bracket 14. The platform 18 is then rotated with the second bracket 14 and the third bracket 16 about the shaft 76. The platform 18 is rotated about the shaft 76 until the platform 18 is in a desired position and one of the holes 66 in the second bracket 14 aligns with one of the holes 50 in the second plate 22 of the first bracket 12 and one of the holes 36 in the first plate 20 of the first bracket 12. At this point, the pin 94 is inserted into the aligned holes 36, 50, 66 in the first bracket 12 and in the second bracket 14. When the pin 94 is inserted through the holes 36, 50, 66 in the first bracket 12 and in the second bracket 14, the platform 18 is prevented from rotating about a lateral axis of the trailer 140.

In FIG. 11, the trailer 140 is on a 15-degree incline. Thus, the platform 18 is rotated 15 degrees about the shaft 76 in a counter clockwise direction to level the platform 18. The number and the positioning of the holes 66 in the second bracket 14, the holes 50 in the second plate 22 of the first bracket 12, and the holes 36 in the first plate 20 of the first bracket 12 can be adjusted to refine the adjustability of the platform 18 about a lateral axis of the trailer 140.

Although the platform assembly 10 has been described in the context of a boat trailer, the platform assembly 10 can be used in conjunction with various types of trailers other than a boat trailer. For example, the platform assembly 10 may be used in conjunction with a flatbed trailer, a travel trailer, a semi-trailer, a full-trailer, a close-coupled trailer, a motorcycle trailer, and a livestock trailer. In addition, the platform assembly 10 may be used to provide access to and enable manipulation of various items on a trailer other than a winch on a boat trailer. For example, the platform assembly 10 may provide access to and enable manipulation of a trailer hitch on a flatbed trailer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A platform assembly for a trailer, comprising:
    a first bracket including a first plate and a second plate, the first plate and the second plate each including a fastener hole, a first shaft hole, and a first pin hole, the fastener hole receiving a fastener to clamp the trailer between the first plate and the second plate;
    a second bracket including a second shaft hole, a second pin hole, a third shaft hole, and a third pin hole, the first shaft hole and the second shaft hole receiving a first shaft that couples the second bracket to the first bracket, the first pin hole and the second pin hole receiving a first pin that prevents the second bracket from rotating relative to the first bracket about the first shaft;
    a third bracket including a fourth shaft hole, a fourth pin hole, and a channel capturing rollers, the third shaft hole and the fourth shaft hole receiving a second shaft that couples the third bracket to the second bracket, the third pin hole and the fourth pin hole receiving a second pin that prevents the third bracket from rotating relative to the second bracket about the second shaft; and
    a platform supported by the rollers and including a fifth pin hole, the second pin preventing the platform from translating on the rollers when the second pin is inserted into the third pin hole, the fourth pin hole, and the fifth pin hole.

2. The platform assembly of claim 1, wherein the second pin is removable to rotate the third bracket about the second shaft and to translate the platform relative to the third bracket.

3. A platform assembly for a trailer, comprising:
a first bracket including a first plate and a second plate configured to be located on opposite sides of a frame section of the trailer to clamp the frame section between the first plate and the second plate and thereby fix the first bracket to the trailer;
a second bracket secured to the first bracket and including a first pin hole;
a platform coupled to the first bracket such that the platform is translatable relative to the first bracket in a direction that is parallel to a lateral axis of the trailer when the first bracket is fixed to the trailer, the platform including a second pin hole; and
a pin that prevents the platform from translating relative to the first bracket when the pin is inserted into the first pin hole and the second pin hole.

4. The platform assembly of claim 3, wherein the platform is rotatable about the lateral axis of the trailer when the first bracket is fixed to the trailer.

5. The platform assembly of claim 3, wherein the platform is rotatable about a vertical axis of the trailer when the first bracket is fixed to the trailer.

6. The platform assembly of claim 3, wherein the second bracket includes a bearing member on which the platform is translatable.

7. The platform assembly of claim 3, wherein the pin is removable to translate the platform relative to the first bracket.

8. The platform assembly of claim 3, wherein the platform is in a first position relative to the first bracket when the pin is inserted in the first pin hole and the second pin hole, and the platform is in a second position relative to the first bracket when the pin is inserted in the second pin hole and is not inserted in the first pin hole.

9. The platform assembly of claim 3, wherein the second bracket includes a pair of bearing members on which the platform is translatable.

10. The platform assembly of claim 9, wherein the platform is supported by the bearing members.

11. The platform assembly of claim 10, wherein the bearing members in include rollers.

12. The platform assembly of claim 9, wherein each of the bearing members have a U-shaped cross-section defining a slot, the slots receiving edges of the first bracket to fix the bearing members to the first bracket.

13. The platform assembly of claim 12, wherein the bearing members are fixed to the first bracket using a fastener that extends through the bearing member and the edges of the first bracket that are inserted in the slots in the bearing members.

14. The platform assembly of claim 9, wherein the platform includes a horizontal portion for supporting a person and sidewalls extending downward from longitudinal edges of the horizontal portion and engaging the bearing members.

15. The platform assembly of claim 14, wherein the platform includes tabs that extend horizontally from the sidewalls toward a centerline of the platform, the tabs engaging the bearing members to couple the platform to the first bracket.

16. The platform assembly of claim 9, wherein the platform includes endplates that stop translation of the platform relative to the first bracket when the endplates engage the bearing members.

17. The platform assembly of claim 3, wherein the platform assembly includes a biasing mechanism that secures the pin to the platform and biases the pin into the second pin hole.

18. The platform assembly of claim 17, wherein the biasing mechanism biases the pin into the first pin hole when the platform is positioned relative to the second bracket to align the pin and the second pin hole with the first pin hole.

19. The platform assembly of claim 3, wherein the first plate and the second plate each include a fastener hole for receiving a fastener to clamp the frame section of the trailer between the first plate and the second plate.

20. A platform assembly for a trailer, comprising:
a first bracket including a first plate and a second plate configured to be located on opposite sides of a frame section of the trailer to clamp the frame section between the first plate and the second plate and thereby fix the first bracket to the trailer;
a pair of bearing members each having a U-shaped cross-section defining a slot that extends along a length of a respective one of the bearing members, the slots receiving edges of the first bracket to fix the bearing members to the first bracket; and
a platform that is translatable on the bearing members.

* * * * *